Aug. 1, 1933.  C. G. MILBURN  1,920,443
MACHINE FOR PLACING PLASTIC MATERIALS
Filed Feb. 6, 1933
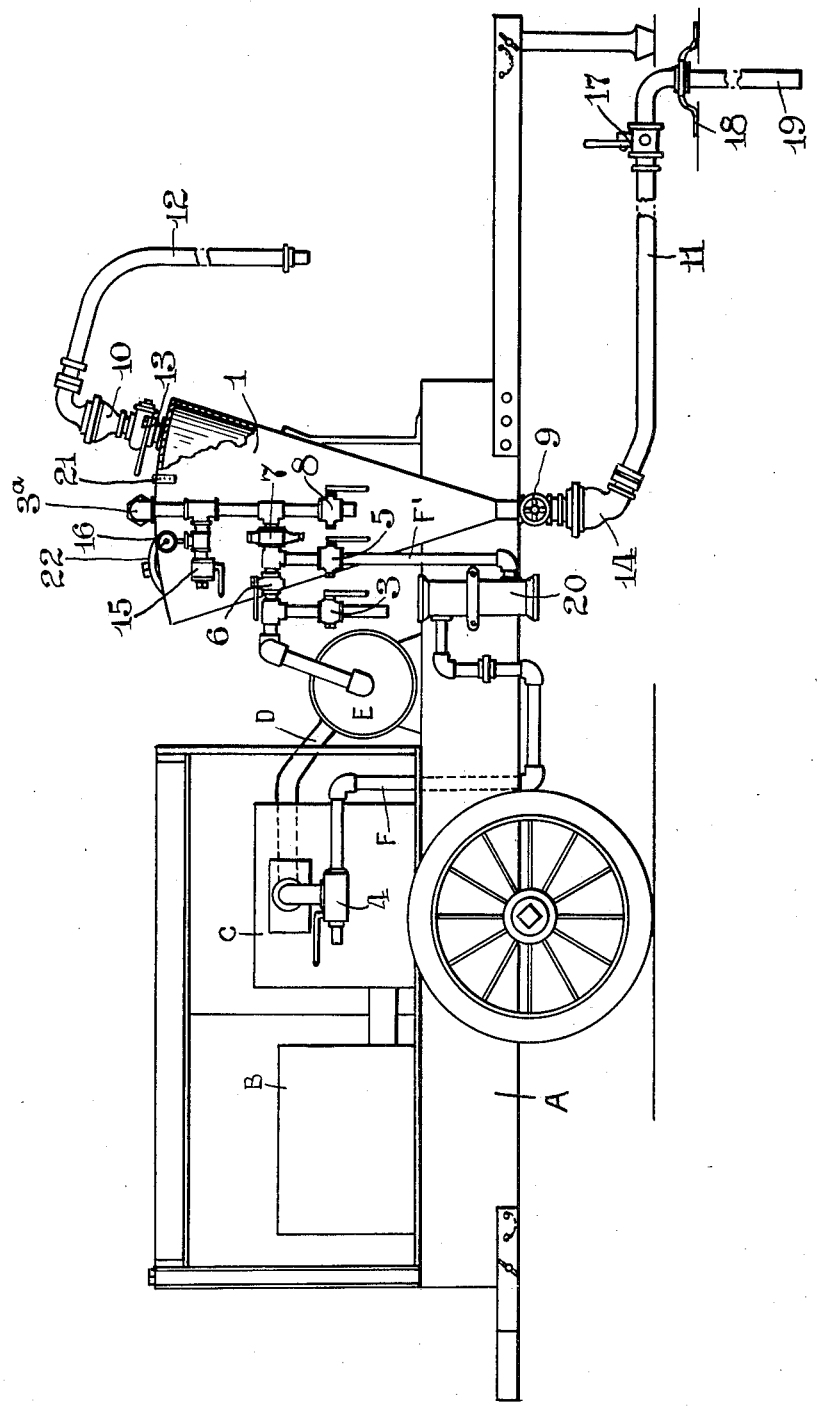
Inventor
CHARLES G. MILBURN
By Finckel & Finckel
Attorneys Patented Aug. 1, 1933

1,920,443

UNITED STATES PATENT OFFICE 1,920,443

MACHINE FOR PLACING PLASTIC MATERIALS

Charles G. Milburn, Upper Arlington, Ohio

Application February 6, 1933. Serial No. 655,537

2 Claims. (Cl. 103—235)

This invention relates more especially to means for and method of placing plastic materials.

Heretofore in transferring and placing plastic materials much expensive and dilatory handling of the material was involved.

One object of this invention is to provide an improved apparatus whereby the plastic material to be placed is first drawn into a closed chamber by a vacuum created therein and then the material expelled from the chamber to the place of application by means of pneumatic pressure. Another object of the invention is to provide a construction of tank or chamber adapted to facilitate the discharge of the material and avoid clogging the walls thereof. In carrying out the invention I provide means whereby the work of charging and discharging the chamber is effected by means of an engine-operated air pump provided with controls whereby the pump can be quickly converted at will from a suction operation to a compression one to successively charge the tank with the plastic material and then discharge it at a place desired.

An embodiment of the invention is illustrated in the accompanying drawing, the view thereof being mainly a side elevation of the right hand side thereof with portions broken out and in section.

In said view A designates a trailer truck upon the rear portion of which is mounted an engine B to operate an air pump C. The pump can be of the variety manufactured by the Ingersoll Rand Company except that it is modified, as well understood, so as to be adapted to create either pressure or a vacuum. When operating to produce pressure the discharge from the pump is through line D to a pressure storage drum E; and when operated to produce suction air is drawn through pipe line F. The pressure tank E can be omitted in some instances.

The character 1 designates a tank or hopper to receive the plastic material, said hopper being of cone form and preferably of a taper internally of approximately 30 degrees. The form of tank shown and described I have found best facilitates the movement of the pressed material therefrom and prevents clogging of the side thereof.

The top of the tank is provided with a closing wall that is tapped with a pipe 3ª having connection with the pressure tank E in which connection is a branch lead to the atmosphere with a cock 3, a two-way cock 6 and sediment separator 7 to prevent dirt from entering the air compressor.

The pipe 3ª has at its lower end an emergency two-way cock 8.

Connected with the pressure tank line between the pipe 3ª and the pressure tank between the cock 6 and sediment separator is a vacuum line pipe portion F' containing a two-way cock 5, and between the vacuum line pipe portions F and F" is an ordinary moisture separator 20 to prevent moisture from entering the compressor.

12 designates a flexible suction hose for conducting the plastic to the interior of the tank, said hose being connected by a straight ball joint with the top wall of the tank, there being interposed between said joint and the tank at 13 a gate valve for opening and closing the passage from the hose to the tank.

The plastic material is discharged from the tank through a flexible hose 11 connected with the lower end of the tank by means of an angle ball joint at 14 between which and the end of the tank is a gate valve 9. Said hose near its free end is provided with a quick-closing gate valve 17, a hose retaining plate 18 and beyond said plate a hole-entering portion 19.

The pipe 3ª has connected with it above the pressure connection before described a short pipe containing an ordinary compound gauge 16 and a relief valve 15. The said gauge 16 is to indicate the degree of pressure or vacuum in the tank.

The character 21 designates an ordinary volume indicator; and 22 an ordinary air tight cover for a manhole in the top wall of the tank.

The apparatus, as shown and described, is especially designed for elevating or jacking up and leveling sunken slabs or portions of a road. The plastic in such cases is wet mud containing a modicum of cement.

To put the unit into operation the air compressor is started and valves 6, 8, and 9 are closed and valve 13 opened. Valve 3 is opened for compression air tank relief. Three-way valve 4 is opened to vacuum pipe line to the tank 1 and closed to atmosphere. Valve 5 is opened to complete circuit from suction pump to tank 1.

The free end of hose 12 is then placed in the source of plastic material to be handled whereupon the air compressor becomes a vacuum pump producing a sufficiently high vacuum in the tank 1 to cause the material to flow into said tank. When the tank is supplied with the plastic material to the desired level, the hose 12 is withdrawn from the mixture and the valve 13 closed. The three-way valve 4 is then adjusted so as to open compressor suction to the atmosphere. The valves 3 and 5 are then closed and valve 6 opened, whereupon the compressor builds up pressure in tank 1. When the pressure in the tank is sufficiently high to force the plastic material out of the tank the valve 17 is closed and valve 9 opened.

The valve 8 is a precautionary tank exhaust.

The operator then introduces the hose end 19 into a hole drilled into and through a slab, pavement or foundation and stands with his weight on the plate 18 thereby to hold said plate in position while the plastic is being applied.

By opening and regulating the degree of opening of the valve 17 the operator permits the amount of material to flow under the object to be raised to force the object up to the level desired. When the material is exhausted from the tank the valves 17 and 9 are closed and the operation repeated.

From the construction shown and described it will be observed that the apparatus can be easily transported from place to place, and that in operation it is only necessary to handle the hose, the engine and air controls.

The apparatus is very powerful in its jacking effect and can be used for leveling a large bridge or other very heavy structure.

While I have illustrated and described an apparatus for elevating objects it can be used for other purposes where clay plastic or other similar fluent material of heavy specific gravity is to be applied.

The forms of the parts can be changed without departing from the gist of the invention as claimed.

What I claim is:

1. In portable means for placing a plastic of high specific gravity, an air pump adapted to be converted from a suction to a force pump, a closed tank of cone form inverted and having at its top an intake opening, a manually operable cut-off valve for closing the same and an intake flexible hose communicating with the tank through said opening, said tank having at its bottom or apex end a discharge opening provided with a manually operable cut-off valve and a flexible discharge hose, and means connecting the top of said tank with said convertible suction and force pump whereby in operation a vacuum may be created in the tank to charge the tank with said plastic material through said upper hose and then after suitable manipulation of said valves create pneumatic pressure in the tank to discharge the plastic material through said lower hose under pressure to the point of application of said plastic material.

2. In portable means for placing a plastic material of high specific gravity, an air pump adapted to be converted from a suction to a force pump, a closed tank of cone form inverted, said tank being of approximately an internal taper of thirty degrees and having at its top an intake opening, a manually operable cut-off valve for closing said opening and an intake flexible hose communicating with the tank through said opening, said tank having at its bottom or apex end a discharge opening provided with a manually operable cut-off valve and a flexible discharge hose, and means connecting the top of said tank with said convertible suction and force pump whereby in operation, a vacuum can be created in the tank to charge the tank with said plastic material through said upper hose and then, after suitable manipulation of said valves, create pneumatic pressure in the tank to discharge the plastic material through said lower hose under pressure to the point of application of said plastic material.

CHARLES G. MILBURN.